United States Patent
Jia et al.

(10) Patent No.: US 7,000,119 B1
(45) Date of Patent: Feb. 14, 2006

(54) INSTRUCTION/DATA PROTECTION EMPLOYING DERIVED OBSCURING INSTRUCTION/DATA

(75) Inventors: Zheng Jia, Germantown, MD (US); Ji Shen, Gaithersburg, MD (US)

(73) Assignee: RealNetworks, Inc., Seattle, WA (US)

( * ) Notice: Subject to any disclaimer, the term of this patent is extended or adjusted under 35 U.S.C. 154(b) by 0 days.

(21) Appl. No.: 09/552,951

(22) Filed: Apr. 20, 2000

(51) Int. Cl.
*H04L 9/00* (2006.01)
*G06F 11/30* (2006.01)
*H04K 1/04* (2006.01)

(52) U.S. Cl. .................. 713/194; 713/189; 713/190; 380/37; 380/42; 380/43

(58) Field of Classification Search ............... 713/189, 713/190, 200
See application file for complete search history.

(56) References Cited

U.S. PATENT DOCUMENTS

| | | | |
|---|---|---|---|
| 5,151,938 A | 9/1992 | Griffin, III et al. | |
| 5,388,211 A | 2/1995 | Hornbuckle | |
| 5,410,598 A | 4/1995 | Shear | |
| 5,708,709 A | 1/1998 | Rose | |
| 5,717,756 A | 2/1998 | Coleman | |
| 5,758,069 A | 5/1998 | Olsen | |
| 5,764,762 A | 6/1998 | Kazmierczak et al. | |
| 5,790,663 A | 8/1998 | Lee et al. | |
| 5,805,706 A | 9/1998 | Davis | |
| 5,825,883 A | 10/1998 | Archibald et al. | |
| 5,826,011 A | 10/1998 | Chou et al. | |
| 5,889,866 A | 3/1999 | Cyras et al. | |
| 5,892,899 A | 4/1999 | Aucsmith et al. | |
| 5,920,861 A | 7/1999 | Hall et al. | |
| 5,982,891 A | 11/1999 | Ginter et al. | |
| 5,987,572 A | 11/1999 | Weidner et al. | |
| 5,991,399 A | 11/1999 | Graunke et al. | |
| 5,991,402 A | 11/1999 | Jia et al. | |
| 6,006,328 A | 12/1999 | Drake | |
| 6,049,609 A | 4/2000 | Maliszewski | |
| 6,061,449 A | 5/2000 | Candelore et al. | |
| 6,112,181 A | 8/2000 | Shear et al. | |
| 6,175,925 B1 | 1/2001 | Nardone et al. | |
| 6,178,509 B1 | 1/2001 | Nardone et al. | |
| 6,205,550 B1 | 3/2001 | Nardone et al. | |
| 6,502,126 B1 * | 12/2002 | Pendakur ................... | 709/204 |

FOREIGN PATENT DOCUMENTS

| | | |
|---|---|---|
| WO | PCT/US97/10359 | 12/1997 |
| WO | PCT/US98/12017 | 6/1998 |
| WO | PCT/US98/12017 | 1/1999 |
| WO | PCT/SE98/01554 | 3/1999 |
| WO | PCT/US98/14858 | 3/1999 |
| WO | PCT/US98/14914 | 3/1999 |
| WO | PCT/US99/29150 | 6/2000 |

* cited by examiner

*Primary Examiner*—Kambiz Zand
(74) *Attorney, Agent, or Firm*—Steven C. Stewart, RealNetworks, Inc.; Schwabe, Williamson & Wyatt, P.C.

(57) ABSTRACT

A method and apparatus are described for protecting critical computer software and/or data with a large amount of obscuring instructions and or data to the extent that observing and understanding the obscured instructions and/or data is not humanly feasible. In a preferred method of obscuring software, a bank of obscuring instructions is prepared, a large number of obscuring instructions are selected from the bank and injected in the software code to be protected and a static image of the obscured sequence of code is encrypted and/or compressed. At execution, the obscured instructions are executed one at a time to make run time tracing a labor intensive process.

24 Claims, 8 Drawing Sheets

INSTRUCTION/DATA PROTECTION EMPLOYING DERIVED OBSCURING INSTRUCTION/DATA

BACKGROUND OF THE INVENTION

1. Field of the Invention

The present invention relates to methods and apparatus that can prevent, resist, or deter reverse engineering and tampering with information such as computer software or data files during both the static and dynamic states of its presence on a system.

2. Background of the Invention

Most computer software and data found on commercially available general purpose operating systems are exposed to a threat of being reverse engineered or tampered with using widely available disassembling, de-compiling, debugging, and in-circuit emulating utilities. Despite the employment of cryptographic algorithms, hardware dangles, and software encryption, software and data remain vulnerable to security attacks. Such vulnerability exists regardless whether the software and data are present on a computer system in a static state (such as on a hard drive or other non-volatile storage media) or a dynamic state (such as in residence in a cache memory or main memory).

For example, by taking advantage of the appropriate utilities, an attacker skilled in the art of computer security or security cracking can observe and re-assemble the instructions of a software program by tracing their execution image in memory. The attacker can further monitor and/or alter a software program's secret operations such as its interactions with physical components of a computer. The attacker can also de-compile and analyze compiled code in the static state and then alter critical sections of the compiled code to compromise security.

To increase the difficulty for an attacker to observe, understand, or modify source code, companies such as Intel and Intertrust have introduced elaborate schemes of transformation or slicing of source code. The potential pitfall of these protection schemes is that they rely on the ingenuity of their designers. Attackers on the other hand similarly rely on their ingenuity to reverse engineer a protector's design. Thus, the effectiveness of the protection system becomes an ingenuity contest between the protector and the attacker. Unfortunately, this fails to provide a scientific measure of how easy or how difficult it is for the ingenious protection mechanisms to be broken.

For these and related reasons, we assume that (1) all compiled code and data files are observable given the availability of commercial hardware and software utilities; (2) all elaborate schemes can be reverse engineered by ingenuity; and (3) attackers know the design of security schemes every bit as well as the designers. We believe the security of a protection system should be predictable and measurable. The most appropriate and reliable measure is probably the computation time and cost required to crack the protection system. In particular, true security lies in a predictable, large work factor for attackers. Such work factor should be large enough to make it humanly impossible to comprehend the protected source code and data files, and exponentially time consuming and expensive for computers to do so.

SUMMARY OF THE INVENTION

The present invention protects computer software by adding to the software large numbers of obscuring instructions selected from an obscuring code bank. Preferably, the obscuring instructions selected from the obscuring code bank are made to resemble the computer code that is obscured to achieve uniqueness of obscuration at each installation. Such obscuration can be achieved through embodiments both at the source code level and the object code level although different apparatus may need to be employed.

Preferably, the obscuring instructions are generated in functional groupings called "blocks". Advantageously, at least some of the blocks of obscuring instructions are formed from other blocks by a transformational relationship. Specifically, for any two successive blocks, $C_1$ and $C_2$, that have a transformational relationship, the instructions in $C_2$ can be determined and generated by performing a mathematical transformation T on number codes associated with the instructions in $C_1$. And, in general, any block $C_N$ is generated by a series of mathematical transformations T such that $C_N = T_N(T_{N-1}(\ldots(T_3(T_2(C_1)))\ldots))$ where $C_1$ is an initial block of obscuring instructions selected from the obscuring code bank. Conversely, instructions in $C_1$ can be determined and generated by performing the inverse mathematical transformation on number codes associated with the instructions in $C_2$. Advantageously, different mathematical transformations are used between different pairs of successive blocks and the transformations are randomly selected so as to achieve uniqueness for each set of obscuring instructions that is generated.

To enhance security, the obscured object code is encrypted and stored in the form of superblocks of concatenated blocks of code. Consequently, each block of code in a superblock can be decrypted only if the blocks of code that precede it in the superblock have previously been decrypted. This results in an obscured package of code that is resistant to analysis of the statically stored code or to any tampering while in the static state.

Advantageously, the obscured object code may also be compressed to remove some of the redundancy arising from the use of mathematical transformations to generate some of the obscuring code blocks.

In the present invention, the obscured code package is loaded into a computer's real memory block by block. A run time apparatus is employed to decrypt/decompress and generate the obscured instructions of each block starting with $C_1$. The generated instructions of each block are loaded into memory by this apparatus at a dynamically determined address that is unique for each block. After loading the block, the run time apparatus switches control to the instruction block for execution. When execution of each block is completed, control is switched back to the run time apparatus to load the next block. The process continues until instructions in all the blocks are executed. The dynamic loading and execution of each block makes it virtually impossible to trace instructions that are only generated and executed in real time.

A preferred method of operating the invention to protect a sequence of computer code comprises the steps of: preparing simple obscuring instructions that are comprehensible yet require considerably more time to read and understand; injecting a large number of obscuring instructions into the sequence of computer code in an automated process to produce an obscured sequence of computer instructions that in total is humanly impossible to read and understand; compressing and/or encrypting a static image of the obscured sequence to protect against direct decompilation; and executing the obscured instructions one instruction at a time, thereby making run time trace and observation a labor intensive manual process. Preferably, the method provides a computational work factor that is exponential at least on the scale of $N^3$ where N is the number of obscured instructions and potentially may be as much as $e^{N \log N}$. For example, for 10,000,000 obscured instructions, it can be expected that it would take over 250,000 years on a modern PC (e.g., 500 MHZ clock rate) to locate and reverse engineer the protected sequence of computer code.

In similar fashion, the present invention also protects data files by adding to the data large numbers of obscuring data selected from an obscuring data bank. Blocks of obscuring data can also be generated that are related to each other by a mathematical transformation. The transformation can be performed either on the data itself or on number codes associated with each item of obscuring data.

To enhance security, the obscured data may likewise be encrypted and/or compressed. This may be done as part of the same process that encrypts and/or compresses the obscured object code or it may be done separately.

BRIEF DESCRIPTION OF THE DRAWINGS

These and other objects, features and advantages of the invention will be more readily apparent from the following detailed description in which.

DETAILED DESCRIPTION OF THE DRAWINGS

Figure 1:
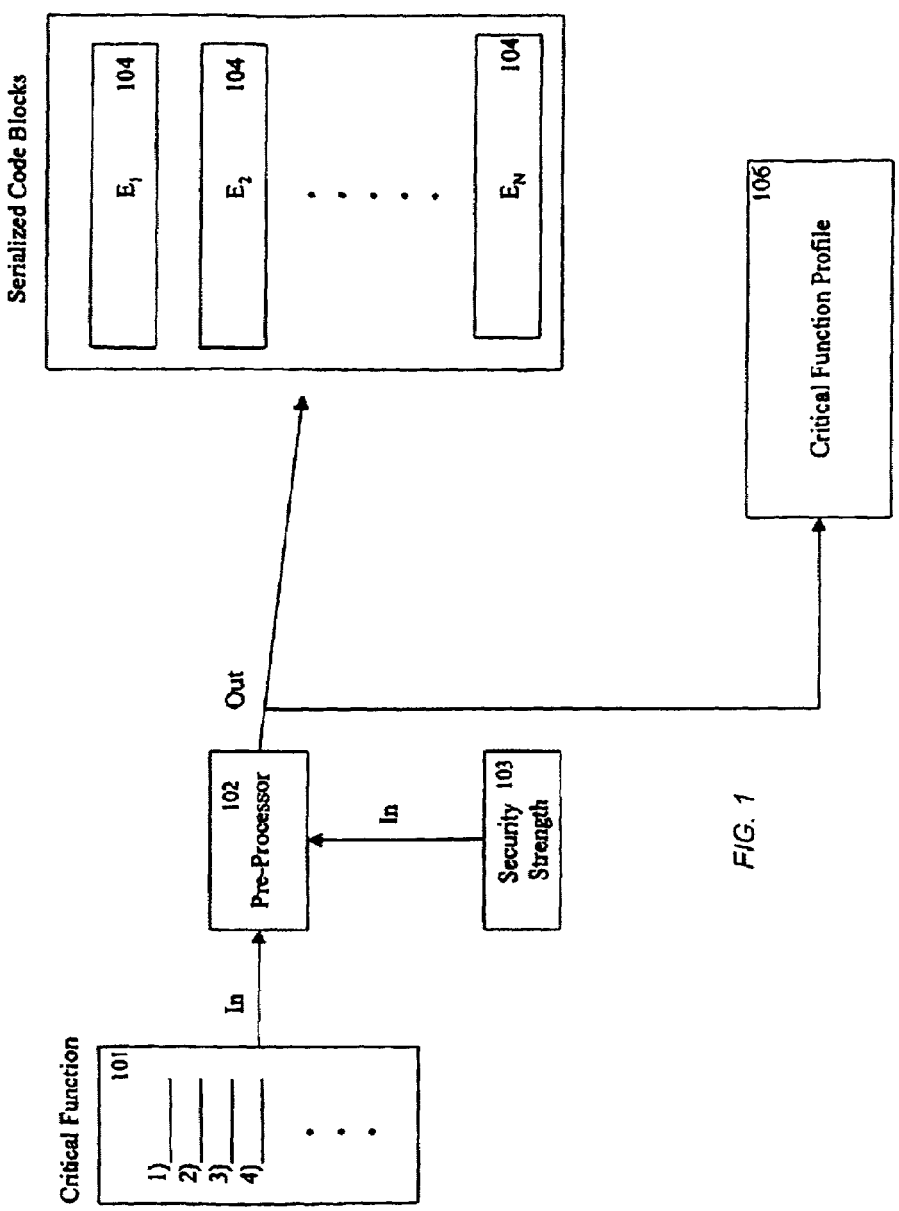
FIG. 1 describes a first part of the apparatus of the present invention.

In FIG. 1, a pre-processor 102 parses source code 101 to generate serialized code blocks 104 and a critical function profile 106. This process is completed on the source code level at pre-compile time. Source code 101 is typically the source code used in critical functions, such as the most crucial part to the overall security of a computer program, or source code that contains the most essential implementation details in realizing certain valuable design and other trade secrets. The present invention is primarily to protect the critical function source code from being identified, observed, traced for execution or modified (often referred to as "patched"). Source code 101 is considered serialized in the present invention when all subroutine calls in source code 101 have been fully expanded into sequentially listed instructions in one self-contained body function/subroutine. By transforming source code 101 into the serialized code blocks 104, source code 101 is prepared for injecting obscuring code in later stage processes of the present invention.

Pre-processor 102 uses a user defined security strength 103 as an input parameter in determining the number of lines of code to be generated in each code block 104 and the total number of code blocks 104. For the highest level of security strength 103, each code block 104 will contain at most only one line of source code 101 or one instruction, and the total number of code blocks 104 is equal to or greater than the number of lines of source code in the critical function source code 101. For the lowest level of security strength 103, there could be only one code block 104 that may contain all the original source code 101 within the single block. For other levels of security strength 103, the pre-processor 102 may randomly set a number of code blocks, NC, and randomly determine the number of instructions, NI, in each code block 104.

Pre-processor 102 also generates a data set called critical function profile 106 that describes the nature of the source code contained in the critical function source code. Profile 106 is understandable to other components of the present invention and is utilized for selecting obscuring code that "looks" similar to make it difficult for an attacker to distinguish the original critical function source code 101 and the obscuring code that is injected later.

As an example of obscuring a simple instruction in a function, consider a simple C program segment where the critical operation instruction is "V1=1024":

```
Function1 ( . . . ) {
   . . .
   Int V1; //declare the variable as integer type
   V1 = 1024; //Assign value to V1
   . . .
   Return V1; //return the value of V1
}
```

The objective here is to obscure the assignment operation V1=1024, which is simple and straight forward and will not take more than a few seconds for a person skilled at the art to understand. However, by simply injecting some obscuring code, the obscured code will be significantly more time consuming to read and comprehend. The obscuring code selected may include a number of assignment instructions and some simple calculation instructions.

```
ObsFunction1 ( . . . ){
Int V1, V2, V3, V4;
   . . .
   V1 = 1024;
   V1 = V1 + 1024;
   V2 = 1024;
   V2 = V2 + 1024;
   V3 = V2;
   V3 = V3 − V2;
   V4 = 1024;
   V4 = V4 + 1024;
   V4 = V4 − V4
   V2 = V2 − 1024;
   V1 = V1 − 1024;
   V2 = V2 − 1024;
   V1 = V1 + V2 + V3 + V4;
   . . .
   Return V1;
}
```

With the added obscuring instructions, it is still possible to isolate V1 out of V2, V3, and V4. However, now it will take a few minutes before a skilled person can read and identify the original critical instruction "V1=1024". The complexity of this example increases enormously when the original critical instructions are composed of 10 to 20 lines of instructions, these instructions are mixed with obscuring instructions on the order of millions including both instructions that are similar to the instructions to be protected and instructions that are dissimilar, and the critical instructions are randomly spread across many blocks. In fact, it becomes so time consuming to read and comprehend the obscured output that it will become humanly impossible. For example, consider the difficulties involved in interpreting a sequence of code if, instead of four values V1, V2, V3 and V4, the code included 100,000 values, returned all 100,000 values and there was no indication of which value or values had any significance.

Figure 2:
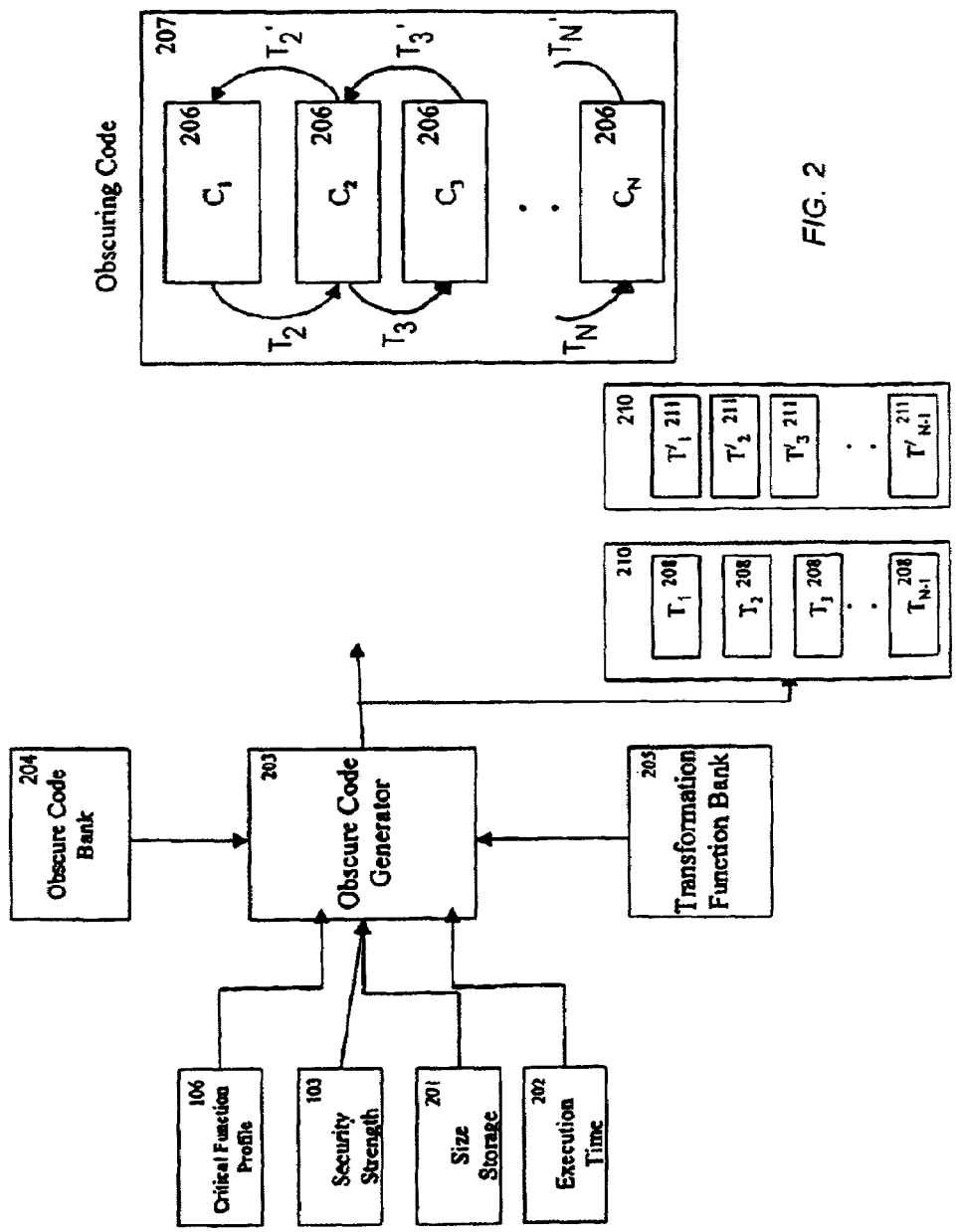
FIG. 2 describes a second part of the apparatus of the present invention.

FIG. 2 depicts an obscuring code generator 203 and two predefined code banks: an obscuring code bank 204 and a transformation function bank 205. In FIG. 2, obscuring code generator 203 generates obscuring code blocks 206 that are used to protect the critical function source code 101. Illustratively, the available storage size is one million lines of code, the size of each block 206 is 125 lines of code, and there are 8000 blocks of code. Obscuring code generator 203 uses the critical function profile 106, security strength 103, storage size 201, and execution time 202 as input parameters for generating obscuring code from the two predefined code banks.

Obscuring code bank 204 is a database that contains program instructions previously created through a manual, automated, or a combination of manual and automated process. Associated with each instruction is a unique numeric code. Thus, each numeric code identifies an obscuring instruction and the entire set of numeric codes identifies the entire set of obscuring instructions. Advantageously, each numeric code may simply be the memory address at which the instruction is stored in the obscuring code bank. Each code block 206 is a subset of the obscuring instructions available in obscuring code bank 204 and the instructions in block 206 can be identified by the numeric codes associated with those instructions.

The program instructions in bank 204 comprise a large pool of instructions that are often built upon expertise and experience of the database designers. A large number of them resemble the most frequently used instructions in commonly used programming languages although a significant portion of them are purely random code without predefined profile. As indicated in the example given above, obscuring code may perform a function (e.g., returning the value V1=1024) that is useful to the critical function code to be protected but do so in a way that is very inefficient. Indeed, it may be spectacularly inefficient. Alternatively, as suggested by operations such V4=V4−V4, the code may be functional but may do nothing more than perform an operation and later perform the inverse of the operation so as to produce no effect other than obscuring the code to be protected. Other examples of obscuring code may have nothing do with the operation of the code to be protected but will still have to be deciphered because an attacker will not know which code is relevant and which is not.

The presence of the obscuring instructions injected into the critical function source code has a direct impact on any attacker's ability to understand or modify the correct instructions in order to compromise the system's integrity. As an example, a segment of 10 lines of instructions that performs certain essential functions of a software application is serialized, distributed into multiple code blocks and mixed with 1,000,000 lines of obscuring code instructions. Using modern day microcomputers, one can assume that the typical CPU clock speed is beyond 500 MHZ. At such speeds, it takes a microcomputer no more than 8 milliseconds to execute all 1,000,000+ instruction provided the instructions perform relatively simply calculations, assignments and minimal I/Os. While the computational overhead is relatively low, the job for an attacker to understand and modify the key parts of these instructions is an insurmountable task. Even though the task of obtaining and observing the instructions is already difficult, let's assume an attacker can capture all 1,000,000 plus instructions and can observe and analyze them. This number of instructions amounts to 16,667 pages of printout on regular letter sized paper. Assuming the attacker can read at the speed of 3 minutes per page and work for an average of 8 hours a day, it will take him over 100 days just to finish reading the content in order to reach a shallow understanding of the instructions. As a practical matter, careful examination and much more time will ordinarily be required to identify the original 10 lines of critical instruction out of the 1,000,000 obscuring instructions.

Furthermore, if a certain set of instructions is of even higher importance in a software application, more obscuring instructions can be injected. Consider the example of injecting 10,000,000 obscuring instructions. A modern computer can process these instructions within 80 milliseconds. However, the attacker will be challenged with a total of 166,667 pages of printout, and over three years just to finish reading them casually. The challenge is practically equivalent to finding a small needle in the Atlantic Ocean, which is humanly impossible to do.

Current and future advances in computer microprocessor are rapidly accelerating. Today, CPUs that work at one GHz have been announced and CPUs that work at over 500 MHZ are commonplace. The faster a CPU can process instructions, the more obscuring instructions can be injected to protect critical functions of applications, and consequently, the harder it becomes for attackers to understand, identify or modify the protected instructions.

Additionally, there are no currently known pattern recognition algorithms that can automatically parse, understand and locate critical instructions found in a large number of obscured instructions. Due to the largely random nature of the obscuring instructions, the pattern recognition task can be highly difficult. By adding more elaborate transformations and slicing of original code in combination with the large number of injected obscuring code, development of a pattern recognition algorithm can be made even more difficult. It is reasonable to assume the computational complexity of such an algorithm is at least as high as $O(N^3)$, where N is the number of instructions, with the possibility of being even as high as $O(e^{N \log N})$. In the case of 10,000,000 ore more instructions, using the $O(N^3)$ estimate, one can expect the computation can take as long as 250,000 years on a 500 MHz CPU modern day personal computer.

On the other end of the scale, it is evident that substantial protection can be achieved using far fewer obscuring instructions than 1,000,000. Even 10,000 lines of obscuring instructions represent a day's effort to read and typically much more time to understand. How much more time is a function of the intricacy of the code. As a practical matter with appropriate obscuring instructions, we believe it is reasonable to assume that it would take several months' effort to reach sufficient understanding of 10,000 such instructions to be able to identify and understand the operation of critical instructions embedded in such obscuring instructions. In some applications, several months' time is enough protection. As will be apparent, greater amounts of protection can be achieved with increasing numbers of lines of obscuring instructions. With 100,000 lines of obscuring instructions, we estimate the amount of time for one individual to reach an understanding of the operation of the critical instructions to be several years, which is often the length of time that a software product enjoys commercial success. In such circumstances, 100,000 lines of obscuring instructions may be enough protection.

The transformation function bank 205 is a database previously created to contain mathematical functions that are one-to-one mappings from Set A to Set B and their inverse functions that are one-to-one mappings from Set B to Set A. Associated with each transformation is a unique numeric code. Thus, each numeric code identifies a transformation and the entire set of numeric codes identifies the entire set of transformations. Advantageously, each numeric code may simply be the memory address at which the instruction is stored in the transformation code bank. Preferably, Sets A and B are sets of numeric codes and the transformation T satisfies the following relationships:

$$B=T(A)$$

and $$A=T'(B)$$

where T' is the mathematical inverse function of T. Examples of T might be increment the value of A by 10 or multiply the value of A by 3; and the corresponding inverse functions would be decrement the value of B by 10 and divide the value of B by 3.

Obscuring code generator 203 applies the transformations obtained from the transformation function bank 205 to the numeric codes associated with the obscuring instructions obtained from the obscuring code bank 204 to produce more obscuring instructions. In particular, generator 203 produces blocks of obscuring code 206. The first of these blocks is generated by generator 203 by selecting obscuring instructions from code bank 204. Additional blocks are generated by selecting transformations 210 from transformation function bank 205, applying these transformations to the numeric codes associated with the obscuring instructions found in a previously generated block of obscuring instructions so as to generate a set of transformed numeric codes and forming new blocks 206 of obscuring instructions using the instructions identified by the transformed numeric codes. Preferably, the transformations are selected randomly. The selected transformation functions are represented by elements 208 in FIG. 2 and their inverses by elements 211.

In the event a transformation generates a numeric code that is outside the range of numeric codes, the generated numeric code "wraps around" as in modulus arithmetic so as to generate a numeric code that is within range.

In the embodiment of the invention shown in FIG. 2 the transformation are concatenated so that any block $C_N$ is generated by a series of mathematical transformation T such that $C_N=T_N(T_{N-1}( \ldots (T_3(T_2(C_1))) \ldots ))$, where $C_1$ is an initial block of obscuring instructions selected from the obscuring code bank. By concatenating the transformations, it is possible to generate an enormous number of different transformations while storing only relatively few transformations in the transformation function bank 205. Alternatively, each block can be generated from the first block of obscuring instructions using a single transformation function instead of the concatenated set of functions.

The use of transformations to generate additional blocks of obscuring instructions makes it possible to generate enormous numbers of additional obscuring instructions while allowing the system to compress and encrypt these instructions. To someone trying to understand the instructions, a block of instructions generated by a transformation of associated numeric codes can be every bit as difficult to understand as the original block of instructions. However, the transformed block can be represented simply by the transformation which can be represented by its numeric address in the transformation code bank. Thus, while it would require 125 numeric codes associated with instructions in code bank 204 to represent a first block of 125 obscuring instructions, a single numeric code associated with a transformation in function bank 205 can be used to generate from the first code block another 125 numeric codes associated with instructions in code bank 204 to represent a second block of 125 obscuring instructions and so on for additional blocks of obscuring instructions. Moreover, if the correspondences between the numeric codes and the obscuring instructions and the numeric codes and the transformation functions can be kept secret, the instructions may also be encrypted.

It should be noted, however, that there are also computational costs involved in generating the additional blocks of code using the transformations. As a result, a typical practice is for generator 203 to produce several different blocks of obscuring code by selecting instructions form code bank 204 and then generate from each of these blocks of obscuring code several additional blocks of obscuring instructions by selecting transformations 210 from the transformation function bank 205.

The composition of the first code block, the number of code blocks, the size of each code block, the number of obscuring instructions per line of code to be obscured, and the compression ratio to be maintained are determined by generator 203 from the critical function profile 106, security strength 103, storage size 201 and execution time 202.

Figure 3:
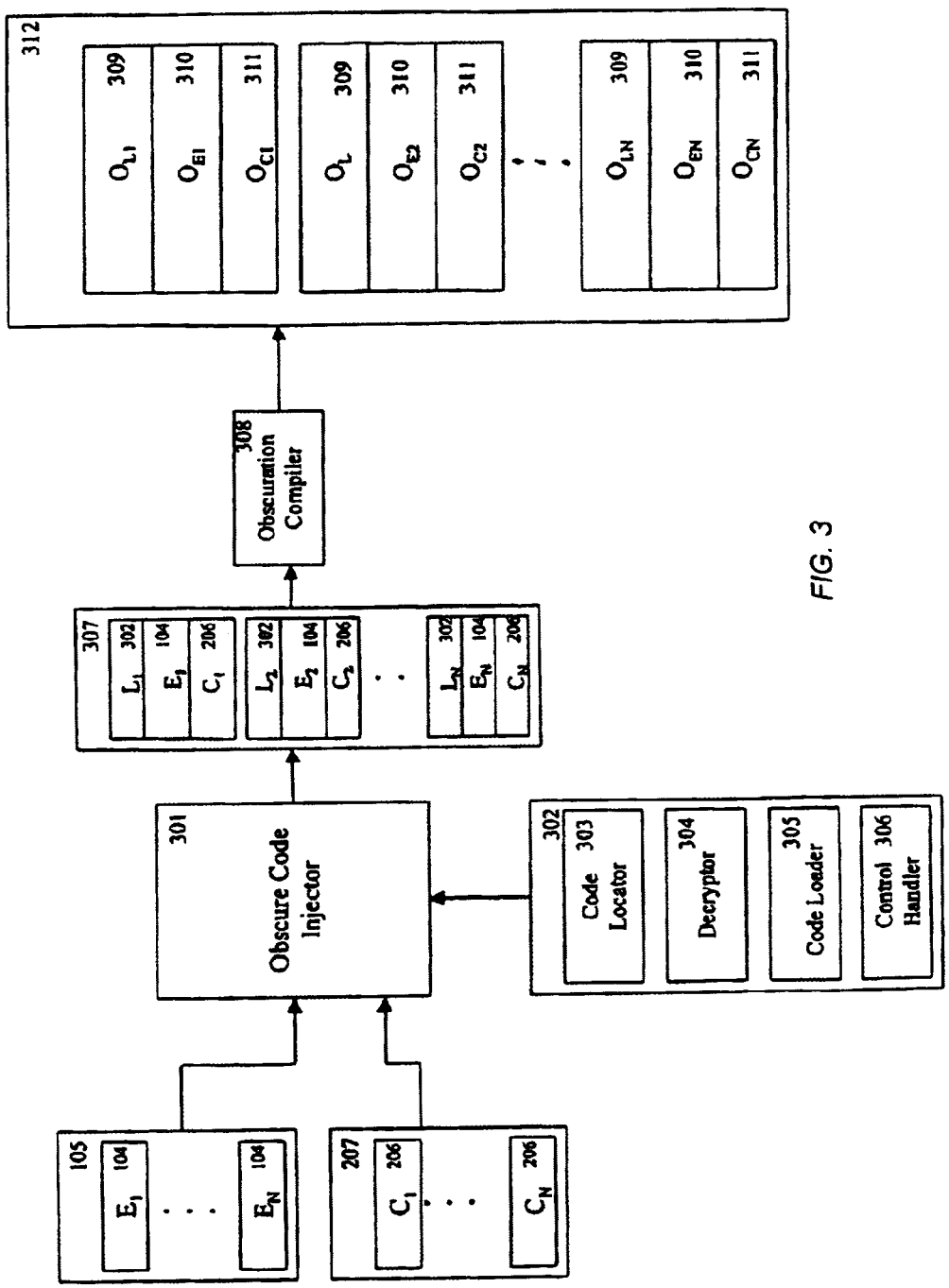
FIG. 3 describes a third part of the apparatus of the present invention.

FIG. 3 depicts an obscuring code injector 301, run time apparatus 302 and an obscuration compiler 308. In FIG. 3, obscuring code injector 301 combines the serialized code blocks 104 and obscuring code blocks 206 with run time apparatus 302 to create a pre-compilation obscured image 307. Obscuration compiler 308 uses the pre-compilation program image 307 as input to create an obscured object level image 312.

Run time apparatus 302 comprises the necessary programming instructions to load blocks of machine level code into a computer's memory for execution and to transfer execution control from one code block to another. A code locator 303 locates one or more blocks of programming instruction from a data file that will be described later in FIG. 6. A decryptor 304 decrypts the code block located by the code locator 303 into plain text machine level code in preparation for execution. A code loader 305 loads the decrypted code block into memory and starts the actual execution of the instructions. A control handler 306 hands over control of execution from the current code block to the next one in queue as soon as the current code block's execution is finished.

Obscuring code injector 301 injects the run time apparatus 302 comprising elements 303, 304, 305, 306 into the serialized critical function source code blocks 104 and the obscuring code blocks 206 to minimize the possibility for the serialized critical function source code to be observed. As a result, image 307 comprises multiple collections of blocks 302, 104, and 206. At this stage, the pre-compilation obscured image 307 is ready to be compiled into object code. The obstruction compiler 308 is applied to pre-compilation obscured image 307 to create object level code blocks 309, 310, 311 in correspondence to blocks 302, 104 and 206. Each collections of a block 309, block 310, and 311 is referred to as an object level block $O_i$ 312.

Obscuration compiler 308 is a special purpose apparatus that augments a regular compiler by preserving the transformation constraints. With a regular compiler, the transformation function T for adjacent obscuring code blocks 206 would be lost once the source code is compiled into object level code using a regular compiler. However, obscuration compiler 308 implements the processing logic to preserve such transformation function even after object level code is created for the source code. Specifically, if the functional constraint exists between block $C_1$ 206 and block $C_2$ 206 and can be defined as follows (same as in FIG. 2):

$$C_2 = T_2(C_1)$$

and $$C_1 = T_2'(C_2)$$

where $T_2$ and $T_2'$ are transformation functions and inverse transformation functions for $C_1$ and $C_2$, then, the obscuration compiler ensures that the corresponding object level code blocks $O_{C1}$ 311 and $O_{C2}$ 311 satisfy the following constraints:

$$O_{C2} = T_2(O_{C1})$$

and $$O_{C1} = T_2'(O_{C2})$$

The implementation of a compiler that preserves the transformation information in this way will be known to those skilled in the art. By so preserving the transformation information, then transformation functions can be applied to the object level code to achieve compression if desired.

Figure 4:
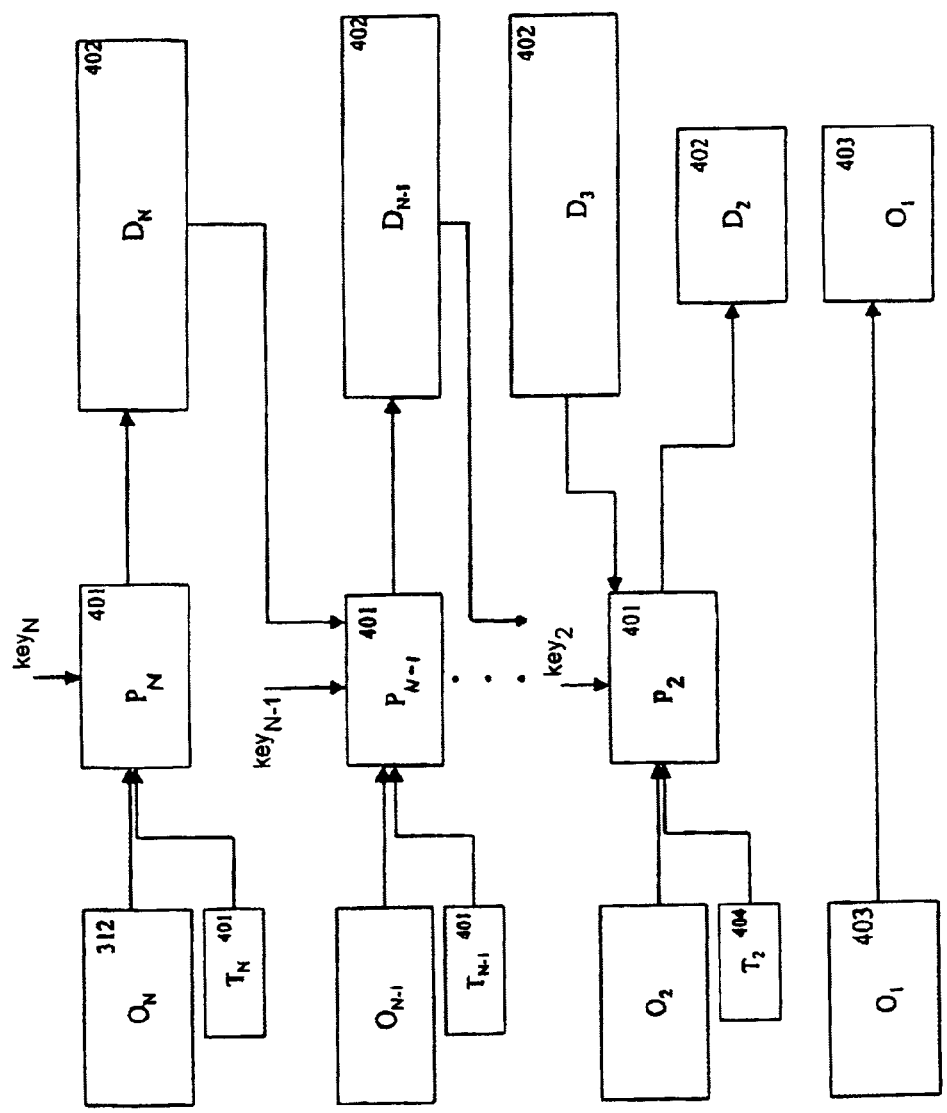
FIG. 4 describes a fourth part of the apparatus of the present invention.

In FIG. 4, an encryption processor 401 takes object level blocks 312 as input, and encrypts them in a recursive chain fashion. The encryption process is applied to all object level code blocks 312 starting with $O_N$ which includes blocks $O_{LN}$ 309, $O_{EN}$ 310, and $O_{CN}$ 311 and ending with $O_2$ which includes blocks $O_{L2}$ 309, $O_{E2}$ 310, and $O_{C2}$ 311. The process is not applied to object code block $O_1$ which includes blocks $O_{L1}$, $O_{E1}$, and $O_{C1}$ The output of each stage i of encryption processor 401 is $D_i$ 402. The output of each stage except stage 2 is applied as an input to the encryption processor of the next stage.

In general, each encryption processor $P_i$ scrambles and thereby encrypts object level code block $O_i$ 312 and the output of $D_{i+1}$ of the previous processor in accordance with an algorithm specified by a key. Advantageously, a different scrambling algorithm is used for each encryption processor $P_i$ and the key that specifies the algorithm is inserted in clear text in the output $D_i$. This encryption process ensures that the output data file is encrypted and can not be directly de-compiled statically. Because the blocks are encrypted as they are compressed, attackers cannot directly decompile the data files to obtain the entire obscuring and critical function instructions. These characteristics force attackers to trace the execution of the system in this invention during run time as the only feasible means to observe the obscuring instructions.

Figure 5:
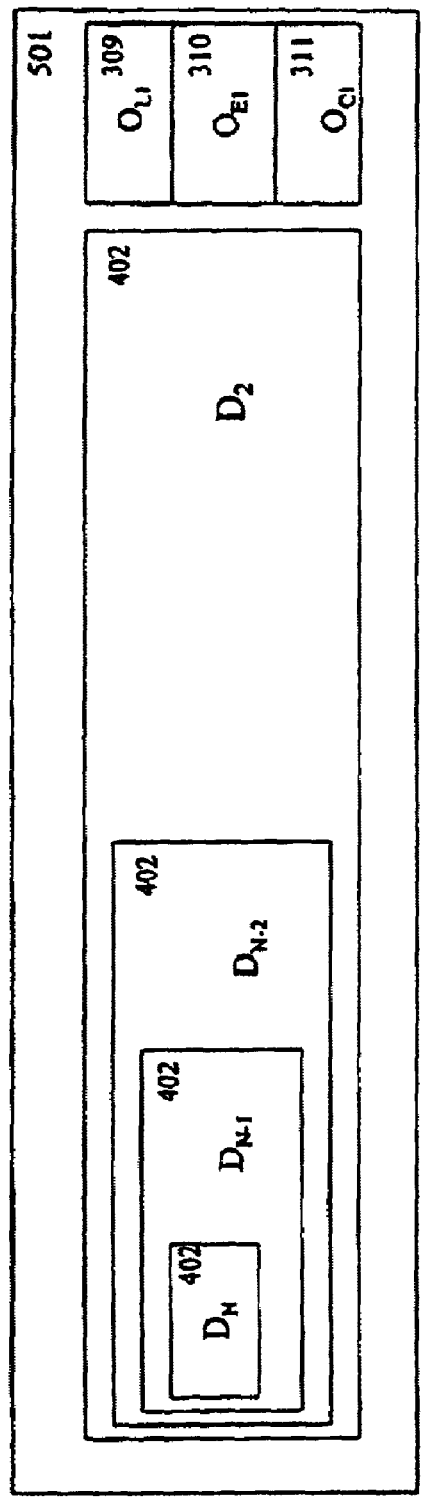
FIG. 5 illustrates the content of a data file used for run time decryption.

FIG. 5 illustrates the data file constructed at the end of the obscuring process. The final data file contains essentially $O_{L1}$ 309, $O_{E1}$ 310, $O_{C1}$ 311 and $D_2$. $D_2$ in turn contains the scrambled form of $D_3$, and $D_3$ contains $D_4$, so on and so forth. Code blocks obscured in this fashion are protected against any direct de-compilation or disassembling attempts, because the contents of the data file are no longer recognizable for utilities that do not understand the specific format and de-compression process.

Because the number of obscuring instructions can be in the millions, it is also desirable to incorporate data compression technology in the encryption processors 401. In the case where blocks of obscuring code are generated by mathematical transformations from a first block of obscuring code generated from obscuring code bank 204, substantial compression can be achieved simply by representing each block in terms of the first block of obscuring code and the numerical codes representing the transformations used to generate the block. Since obstruction compiler 308 ensures that the object level code that represents the obscuring instructions is related by just such a series of transformations, such compression is achievable by replacing the object level code blocks $O_{Ci}$ 311 with the transformations that are used to generate these blocks. In addition, the numeric codes that identify these transformations can readily be scrambled and thereby encrypted at the same time as the encryption processor scrambles and encrypts object level code blocks $O_{Li}$ 309 and $O_{Ei}$ 310.

In particular, in a preferred embodiment of the invention that both encrypts and compresses the object level code, encryption processor $P_N$ 401 scrambles $O_{LN}$ 309 and $O_{EN}$ 310 and the numeric code representing transformation TN in accordance with an algorithm specified by a key $_N$. These scrambled values and the clear text value of the key $_N$ constitute output $D_N$ 402. Compression is achieved by representing $O_{CN}$ 311 in terms of the scrambled numeric code representing transformation $T_N$.

Subsequently, $D_N$ 402, a numeric code representing transformation $T_{N-1}$, a key $_{N-1}$ and the next set of object level code blocks $O_{N-1}$ are used as inputs for encryption processor $P_{N-1}$ 401. At this step, encryption processor $P_{N-1}$ 401 scrambles $O_{LN-1}$ 309, $O_{EN-1}$ 310 and $D_N$ 402, and a numeric code representing transformation $T_{N-1\ 1}$. These scrambled values and the clear text value of key $_{N-1}$ constitute output $D_{N-1}$ 402. Again, compression is achieved by representing $O_{CN-1}$ 311 in terms of the scrambled numeric code representing transformation $T_{N-1}$.

The compression and scrambling process continues for all the object level code blocks in 312 in the same fashion for sequence number N-2, N-3, N-4 . . . except for $O_{L1}$ 309, $O_{E1}$ 310, and $O_{C1}$ 311.

Once the process is complete, $O_{L1}$ 309 can retrieve key$_2$ so as to de-scramble $D_2$ 402 at runtime to retrieve $T_2$, $O_{L2}$ 309, $O_{E2}$ 311 and $D_3$; and $O_{C2}$ 311 can be recreated using $O_{C1}$ 311 and the unscrambled numeric code for transformation $T_2$. However, until $D_2$ is descrambled and $O_{L2}$ is executed, $D_3$ remains undistinguishable. And similarly, until $D_3$ is descrambled and $O_{L3}$ is executed, $D_4$ remains undistinguishable; and so on. Such constructs ensure that all the code blocks are only observable when the scrambled data blocks $O_{L1}$ $D_2$, $D_3$, . . . , $D_{N-1}$ and $D_N$ are scrambled and executed at runtime.

Figure 6:
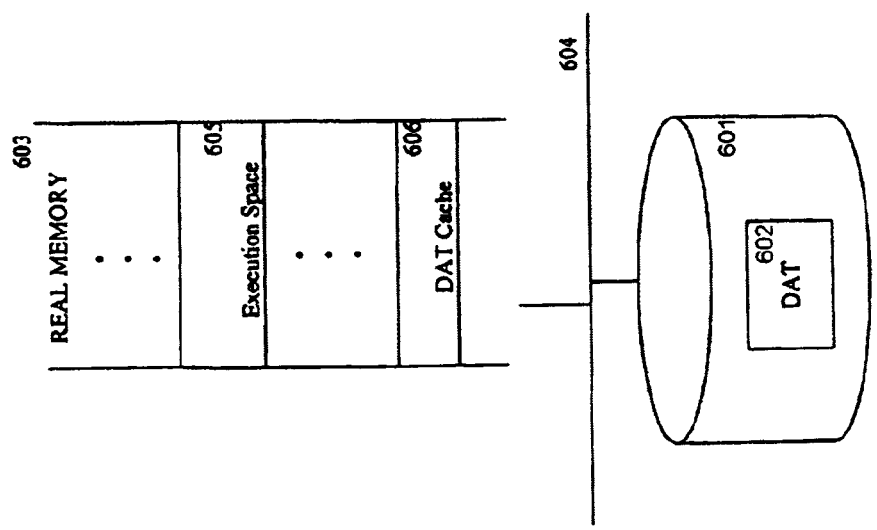
FIG. 6 illustrates the structure of run time components of the system in reference to a computer's execution environment.

FIG. 6 depicts a typical microcomputer system architecture and the execution model of the run time apparatus of the present invention. A data file 602 is stored on the computer's hard disk 601. The data file is loaded into the computer's real memory 603 at run time through the computer's main bus system 604. The actual memory space required to execute the code blocks contained in the data file is allocated separately and is illustrated at 605.

Figure 7:
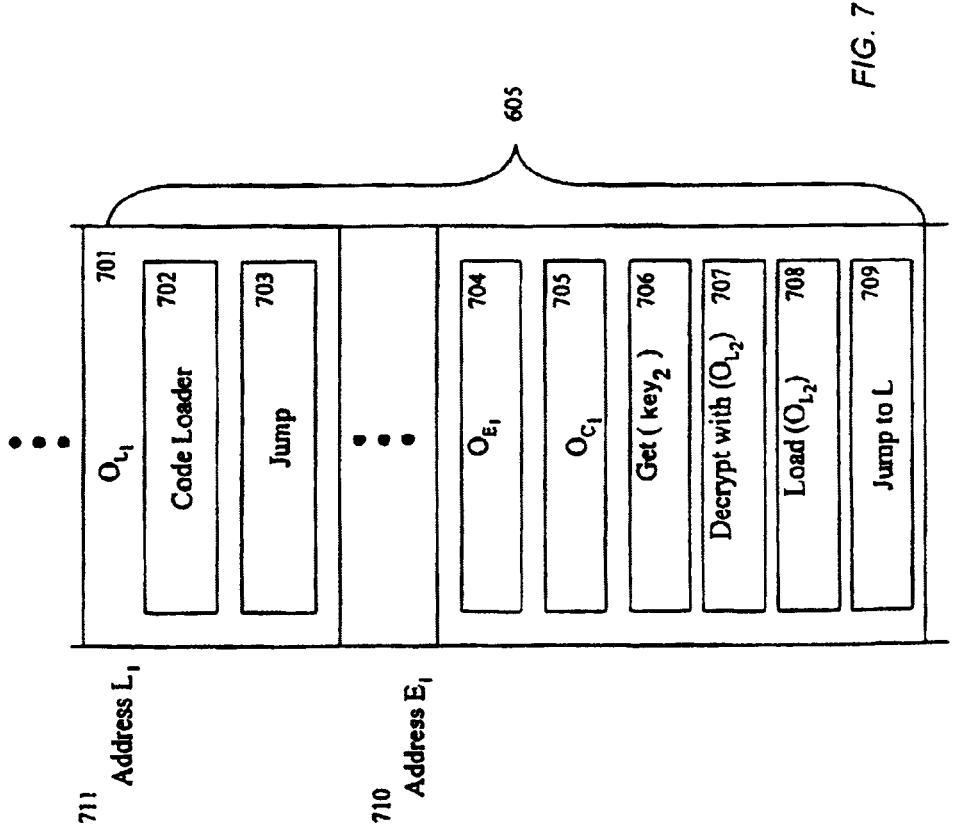
FIG. 7 describes the process of loading and executing the first block of obscured code segments and the loading of data for the first N blocks.

FIG. 7 illustrates how the run time execution process starts with the first set of code blocks being loaded into memory and executed.

All executions of the code blocks are conducted within the memory address space indicated as 605. As the first step, $O_{L1}$ 701 is loaded at memory address $L_1$ 711. This address will remain unchanged for all future $O_{L2}, \ldots, O_{LN-1}, O_{LN}$ code blocks. CodeLoader 702 of $O_{L1}$ executes within this space to allocate a dynamic memory location at address $E_1$, 710. It is important that address $E_1$, 710 be dynamically assigned to ensure that the execution process of the code blocks cannot be automatically traced at a fixed address using conventional or commercially available tools. Because of the dynamic nature of this address allocation, address $E_2$ for the next set pf code blocks $O_{L2}$ cannot be determined until the active instructions of $O_{L1}$ descramble $O_{L2}$.

At address $E_1$, the runtime image of a series of code blocks is loaded and executed, including $O_{E1}$ 704, $O_{C1}$ 705, Get(key$_2$) 706, Decrypt ($O_{L2}$) 707, Load ($O_{L2}$) 708, and "Jump To Address L" 709. $O_{E1}$ 704 and $O_{C1}$ 705 are the mixed instruction blocks that contain both the original instructions in critical function source code 101 and the obscuring instructions for the first code block. The execution of instruction blocks 704 and 705 is the most essential action at this stage.

Get(key$_2$) 706 is the instructions that retrieves the encryption key$_2$ so that $O_{L2}$ can be decrypted and loaded into Address L. Decrypt($O_{L2}$) 707 is the set of instructions that actually decrypts and creates the executable $O_{L2}$ code blocks. "Load ($O_{L2}$) at Address L" 708 loads the decrypted $O_{L2}$ instructions into the static memory address L 711 ready for the next step of processing. "Jump to L" 709 hands the control of execution to the instructions loaded at address L 711. At this stage, the essential functionality has been completed for step one and the system is ready to load and execute the next set of code blocks $O_{L2}$ 309, $O_{E2}$ 310, and $O_{C2}$ 311.

Figure 8:
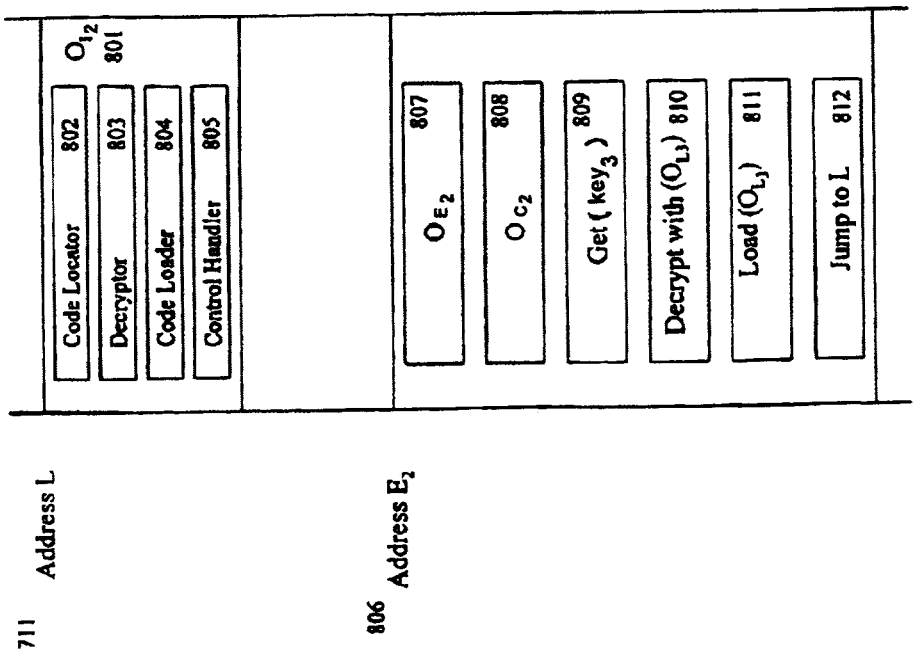
FIG. 8 describes the process of loading and executing the second obscured code block and transfer of control from second block to the third block.

In FIG. 8, $O_{L2}$ 801 has been decrypted and loaded into the static memory address L 711. A code locator 802 locates the compressed and scrambled code for $O_{E2}$ 807 and $O_{C2}$ 808 from the .DAT data file cache 606 and retrieves them for decryption and decompression. Decryptor 803 executes the actual decryption and decompression of the retrieved code blocks. A code loader 804 dynamically determines a memory address $E_2$ 806, allocates the necessary space, and loads the decrypted code blocks into it for execution. A control handler 805 transfers control of execution to the instructions loaded at $E_2$ 806.

$O_{E2}$ 807 and $O_{C2}$ 808 contain the true instructions within the original critical function source code 101 and the obscuring code blocks. They are first executed as the most essential functionality of this step. Subsequent code segments 809, 810, and 811 are similar to the apparatus described in FIG. 7, and are executed to retrieve $O_{L3}$, load $O_{L3}$ into the static memory space at address L, then transfer execution control over to the instructions in that memory space.

The execution of subsequent sets of code blocks, $O_{L4}$ 309, $O_{E4}$ 310, $C_4$ 311, $O_{L5}$ 309, $O_{E5}$ 310, $C_5$ 311, $\ldots$, follow the same process as described above until all code blocks are loaded in memory and executed.

Because the run time apparatus in this invention allows dynamic loading and execution of the blocks in data file, virtually any arbitrary number of obscuring instructions can be executed as long as execution overhead limit permits. Furthermore, because every block of instruction is executed at a dynamically assigned memory address, it makes tracing execution of these blocks a challenging task. Without highly specialized hardware devices, locating the address where a block of instructions is loaded in memory is virtually impossible. These characteristics of the runtime system ensure that obtaining and observing instructions in memory using tracing techniques are laborious and time consuming to the extent of being humanly impossible without the support of highly expensive and special designed hardware devices.

The method and system described in the present invention can be applied to any digital material that includes an executable component. Whenever a software application includes implementation of highly valuable technology or other trade secrets, respective programming instructions can take advantage of the obscuring capability of the current invention. For computer security related products, the present invention offers these products robust anti-trace and anti-decompilation protection for programming instructions that are most vulnerable and critical in the products.

Additionally, an embodiment of the present invention can enable different sets of obscuring programming instructions to be injected for each different protected product, user desktop computer, or user identification. High performance back end server systems can be optimized to extract obscuring instructions from the obscuring code bank specifically and differently according to the input of a machine id, user id, or other uniquely identifying parameters. Such capability to prevent any potential compromise of security can be generically applied to other products, customers, or machines. It can ensure the same amount of computational resource is required to crack each product or machine across a product line or customer line.

As indicated, in the same fashion as the invention is used to protect critical software, the invention may also be applied to the protection of critical data by hiding the critical data amid vast quantities of obscuring data generated from an obscuring data bank. Additional quantities of obscuring data may also be generated by transforming the obscuring data using a transformation function bank. The obscured data may likewise be encrypted and/or compressed either as part of the same process that encrypts and/or compresses the software or independently thereof.

In conclusion, the present invention makes it possible to protect critical programming instructions and/or data by injecting a large amount of obscuring instructions and/or data to the extent that observing and understanding of the obscured instructions and/or data is not humanly feasible. The apparatus and system of the present invention facilitates compression of obscuring instruction and/or data and the runtime execution of the obscuring instructions and/or data so that neither direct de-compilation nor real time tracing of the obscuring instructions and/or data can be achieved without the use of extensive and expensive computing resources only affordable by large organizations over an extraordinary time span.

The invention claimed is:

1. A computer implemented method for protecting a sequence of computer instructions comprising:
   preparing first obscuring instructions having associated identification codes;
   serializing the sequence of computer instructions; transforming a first set of the obscuring instruction identification codes associated with some or all of the first obscuring instructions to generate a second set of obscuring instruction identification codes;
   generating second obscuring instructions using the second set of obscuring instruction identification codes; and
   injecting the second obscuring instructions into the serialized sequence of computer instructions.

2. The method of claim 1, further comprising executing the serialized sequence of computer instructions injected with the second obscured instructions, one instruction at a time.

3. The method of claim 1, wherein the obscuring instruction identification codes comprise numeric values, and said generating of the second set of obscuring instruction identification codes comprises performing a mathematical transformation on the numeric values of the first set of obscuring instruction identification codes to produce the numeric values of the second set of obscuring instruction identification codes.

4. The method of claim 3, further comprising injecting into the serialized sequence of instructions injected with the second obscuring instructions, a description of the mathematical transformation performed.

5. The method of claim 1, wherein said injecting comprises systematically injecting the second obscuring instructions with a plurality of copies of a runtime manager, forming a plurality of obscured instruction blocks, each comprising a copy of the runtime manager, one or more of the serialized sequence of instructions, and one or more of the second obscuring instructions.

6. The method of claim 5, wherein said serialized sequence of instructions, said second obscuring instructions, copies of said runtime manager, and the resulting obscured instruction blocks are in source form, and the method further comprises obscurely compiling the obscured instruction blocks into object form, preserving the obscuration.

7. The method of claim 6, further comprising successively and recursively encrypting up to all, except a root one, of the obscured instruction blocks in object form, to form an obscured executable image having the encrypted ones of the obscured instruction blocks in object form successively nested.

8. The method of claim 7, wherein the successive and recursive encryption further comprises compressing the instructions being encrypted.

9. A program product having a plurality of programming instructions adapted to program an apparatus to enable the apparatus to practice the method of claim 1.

10. A computer implemented method for protecting a data file comprising:
preparing first obscuring data;
injecting second obscuring data into a plurality of locations in the data file using an automated process and the first obscuring data, to organize the data of the data file into a plurality of obscured data blocks, with each of the obscured data block having a portion of the data and one or more obscuring data; and
successively and recursively encrypting the obscured data blocks into a plurality of encrypted obscured data blocks that are successively nested, using a plurality of encrypted keys, with at least the second inner most nested encrypted obscured data block including the inner most nested encrypted obscured data block, an encryption key used in the generation of the inner most nested encrypted obscured data block, and a portion of the data.

11. The method of claim 10, wherein the method further comprises
transforming a first set of obscuring data identification codes associated with some or all of the first set of obscuring data to generate a second set of obscuring data identification codes; and
generating the second set of obscuring data using the second set of obscuring data identification codes.

12. The method of claim 11, wherein the obscuring data identification codes comprise numeric values, and said generating of the second set of obscuring data identification codes comprises performing a mathematical transformation on the numeric values of the first set of obscuring data identification codes to produce the numeric values of the second set of obscuring data identification codes.

13. The method of claim 12, further comprising injecting into the data file injected with the second obscuring data, a description of the mathematical transformation performed.

14. The method of claim 10, wherein the successive and recursive encryption further comprises compressing the data being encrypted.

15. A program product having a plurality of programming instructions adapted to program an apparatus to enable the apparatus to practice the method of claim 10.

16. Apparatus for protecting a sequence of computer instructions, comprising:
means for storing first obscuring instructions;
means for serializing the sequence of computer instructions; and
means for automatically injecting second obscuring instructions and a plurality of copies of a runtime manager into the sequence of computer instructions, using the first obscuring instructions and the runtime manager respectively;
wherein the means of injecting are adapted to systematically inject the second obscuring instructions and copies of a runtime manager into the serialized sequence of instructions to form a plurality of nested obscured instruction blocks.

17. The apparatus of claim 16, wherein the obscured instructions blocks are in source form, and the apparatus further comprises obscuration compiler means for compiling the obscured instruction blocks into a plurality of obscured instruction blocks in object form, preserving the obscuration.

18. The apparatus of claim 17, wherein the apparatus further comprises encryption means for successively and recursively encrypting up to all, less a root one, of the obscured instruction blocks in object form, to form an obscured executable image having the encrypted ones of the obscured instruction blocks in object form successively nested.

19. The apparatus of claim 18, wherein the encryption means includes compression means for compressing instructions being encrypted.

20. Apparatus for protecting a sequence of computer instructions comprising:
an obscuring instruction bank to store obscuring instructions, each of which is identified by an obscuring instruction identification code;
a transformation function bank to store transformation functions adapted to transform obscuring instruction identification codes; and
a generator functionally coupled to the obscuring instruction bank and the transformation function bank to generate blocks of obscuring instructions by selecting identification codes of the obscuring instructions stored in obscuring instruction bank, and transformation functions from the transformation function bank, apply said selected transformation functions to transform the selected obscuring instruction identification codes, and employ the transformed obscuring instruction identification codes to generate additional obscuring instructions.

21. The apparatus of claim 20, further comprising an injector to automatically inject the additional obscuring instructions and copies of a runtime manager into the sequence of computer instructions, to form a plurality of obscured instructions blocks, each comprising a copy of the runtime manager, one or more of the computer instructions, and one or more of the obscuring instructions.

22. A method for executing a plurality of critical instructions, said method comprising:

loading a first executable instruction block of an executable module, the first executable instruction block having one or more of the critical instructions, and the executable module further having a plurality of nested encrypted executable instruction blocks having the remaining of the critical instructions that were generated through successive and recursive encryption, and executing the loaded first executable instruction block, including loading the plurality of nested encrypted executable instruction blocks having a first remainder of the critical instructions, retrieving a first decryption key from the loaded plurality of nested encrypted executable instruction blocks, decrypting the loaded plurality of nested encrypted executable instruction blocks once to recover a second executable instruction block and a first remainder of the plurality of nested encrypted executable instruction blocks having a second remainder of the critical instructions.

23. The method of claim 22, further comprising executing the second executable instruction block, including retrieving a second decryption key from the first remainder of the plurality of nested encrypted executable instruction blocks, decrypting the first remainder of the plurality of nested encrypted executable instruction blocks once to recover a third executable instruction block and a second remainder of the plurality of nested encrypted executable instruction blocks having a third remainder of the critical instructions.

24. A program product having a plurality of programming instructions adapted to program an apparatus to enable the apparatus to practice the method of claim 22.

* * * * *